United States Patent
Chu et al.

(10) Patent No.: US 9,806,650 B1
(45) Date of Patent: Oct. 31, 2017

(54) MOTOR DRIVING APPARATUS

(71) Applicant: ANPEC ELECTRONICS CORPORATION, Hsinchu (TW)

(72) Inventors: Chien-Lun Chu, Kaohsiung (TW); Ching-Feng Lai, Taipei (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 15/361,101

(22) Filed: Nov. 25, 2016

(30) Foreign Application Priority Data

Aug. 31, 2016 (TW) .............................. 105128158 A

(51) Int. Cl.
*H02P 6/00* (2016.01)
*H02P 6/17* (2016.01)
*H02P 6/06* (2006.01)

(52) U.S. Cl.
CPC . *H02P 6/17* (2016.02); *H02P 6/06* (2013.01)

(58) Field of Classification Search
CPC ...... H02P 7/04; H02P 27/085; H02P 2209/09; H02P 27/08; H02P 29/685; H02M 7/529; H02M 7/527; H02K 29/08

USPC ...................................................... 318/400.29
See application file for complete search history.

(56) References Cited

U.S. PATENT DOCUMENTS

| 5,428,522 A * | 6/1995 | Millner ............. | H02M 7/53871 363/63 |
| 2010/0289438 A1* | 11/2010 | Fan Chiang .............. | H02P 6/06 318/400.3 |
| 2013/0307458 A1* | 11/2013 | Tsai .......................... | H02P 7/04 318/504 |
| 2016/0315570 A1* | 10/2016 | Hayashi .................... | H02P 7/29 |

* cited by examiner

*Primary Examiner* — Bickey Dhakal
(74) *Attorney, Agent, or Firm* — Li & Cai Intellectual Property (USA) Office

(57) ABSTRACT

A motor driving apparatus is disclosed, which stops driving a motor in a normal operation state and a start state. The motor driving apparatus adjusts a corresponding switch according to a pulse width modulation (PWM) table, to gradually increase a duty cycle of turning-on the corresponding switch. The PWM table indicates a relationship between a parameter and the duty cycle. The duty cycle increases with the monotone variation of the parameter. Accordingly, the motor driving apparatus can rapidly stop the operation of the motor, to avoid that the motor driving apparatus breaking down or the motor generating noise.

18 Claims, 6 Drawing Sheets

MOTOR DRIVING APPARATUS

BACKGROUND

1. Technical Field

The present disclosure relates to a motor driving apparatus, in particular, to a motor driving apparatus which can rapidly stop driving a motor in a normal operation state and a start state.

2. Description of Related Art

A motor driver is a necessary modern industrial power transformation device. The motor is capable of transforming electricity into kinetic energy required for driving devices. Conventional motors include DC motors, AC motors, stepping motors, and etc. Motors are often applied to drive one element of an electronic device, for example, blades of a fan device are usually rotated with the motor. Therefore, how to design an efficient motor has become a major objective in the industry. The motor driving apparatus is constituted by a stator and a rotor configured opposite to each other. The rotor can rotate with respect to the stator to operate the motor by the magnetic force and magnetic field change, so that the fans configured on the motor are rotated.

During the operation (i.e., a normal operation), when the motor driving apparatus wants to rapidly stop driving the motor, the conventional method is to drive the brake circuit (i.e., the additional circuit element) instantly. However, this conventional method will generate a large current, which may damage the circuit by such a large current flowing through. In addition, this conventional method will also cause noise because the motor quickly stops.

In addition, the un-operated motor is easy to suffer from the influence of external forces (e.g., the force of wind), and it will cause an unstable condition before driving the motor, thereby positively or negatively rotating the motor. Therefore, it will cause the fan which cannot start or break down. The conventional method is to drive the brake circuit (i.e., the additional circuit element) instantly, to rapidly stop driving the motor. However, this conventional method will also generate large current, to break down the motor and the full-bridge circuit flowing through the large current. In addition, this conventional method will also cause noise because the motor instantly stops.

Therefore, how to quickly and effectively stop driving the motor can avoid that the motor driving apparatus breaks down or the motor generates noise.

SUMMARY

An exemplary embodiment of the instant disclosure provides a motor driving apparatus. The motor driving apparatus is adapted for stopping driving a motor in a normal operation state and a start state. The motor driving apparatus comprises a full-bridge circuit, a hall sensor, and a control circuit. The full-bridge circuit has a first switch, a second switch, a third switch, and a fourth switch. The first switch is coupled between an input end and a first end of the motor. The second switch is coupled between the input end and a second end of the motor. The third switch is coupled between the first end and a ground. The fourth switch is coupled between the second end and the ground. The hall sensor is configured for sensing the magnetic field variation of the motor, to generate a hall signal. The control circuit is coupled between the hall sensor and the full-bridge circuit. The control circuit is configured for receiving the hall signal, and storing a pulse width modulation (PWM) table, to control the phase commutation of the full-bridge circuit according to the hall signal and the PWM table. The PWM table indicates a relationship between a parameter and the duty cycle, and the duty cycle increases with the monotone variation of the parameter. When the hall signal indicates a first level, the control circuit turns off the first switch and the second switch, turns on the third switch, and controls the turning on and the turning off of the fourth switch according to the PWM table. When the hall signal indicates a second level, the control circuit turns off the first switch and the second switch, turns on the fourth switch, and controls the turning on and the turning off of the third switch according to the PWM table.

An exemplary embodiment of the instant disclosure provides a motor driving apparatus. The motor driving apparatus is adapted for stopping driving a motor in a normal operation state and a start state. The motor driving apparatus comprises a full-bridge circuit, a hall sensor, and a control circuit. The full-bridge circuit has a first switch, a second switch, a third switch, and a fourth switch. The first switch is coupled between an input end and a first end of the motor. The second switch is coupled between the input end and a second end of the motor. The third switch is coupled between the first end and a ground. The fourth switch is coupled between the second end and the ground. The hall sensor is configured for sensing the magnetic field variation of the motor, to generate a hall signal. The control circuit is coupled between the hall sensor and the full-bridge circuit. The control circuit is configured for receiving the hall signal, and storing a pulse width modulation (PWM) table, to control the phase commutation of the full-bridge circuit according to the hall signal and the PWM table. The PWM table indicates a relationship between a parameter and the duty cycle, and the duty cycle increases with the monotone variation of the parameter. When the hall signal indicates a first level, the control circuit turns off the third switch and the fourth switch, turns on the first switch, and controls the turning on and the turning off of the second switch according to the PWM table. When the hall signal indicates a second level, the control circuit turns off the third switch and the fourth switch, turns on the second switch, and controls the turning on and the turning off of the first switch according to the PWM table.

To sum up, the motor driving apparatus gradually increases the duty cycle according to the variation of the parameter related to the operation of the motor (e.g., the time, the rotation speed, the temperature, or other parameter related to the operation of the motor), so as to rapidly stop driving the motor, and to avoid the motor driving apparatus breaking down or the motor generating noise.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
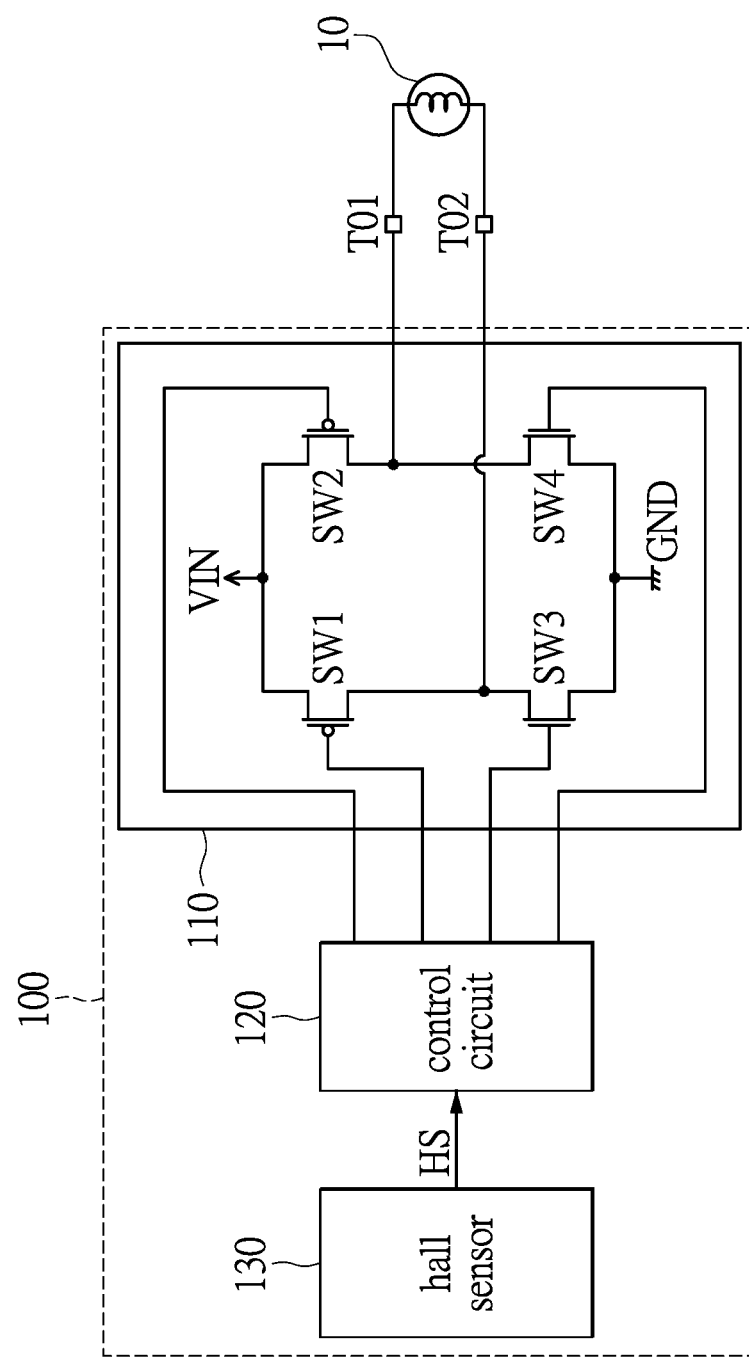
FIG. 1 shows the diagram of a motor driving apparatus according to an embodiment of the instant disclosure.

Reference will now be made in detail to the exemplary embodiments of the present disclosure, examples of which are illustrated in the accompanying drawings. Wherever possible, the same reference numbers are used in the drawings and the description to refer to the same or like parts.

This embodiment provides a motor driving apparatus, which adjusts a corresponding switch according to a pulse width modulation (PWM) table, to gradually increase the duty cycle. The PWM table indicates a relationship between a parameter (e.g., the time, the rotation speed, the temperature, or other parameters related to the operation of the motor) and the duty cycle. The duty cycle increases with the monotone variation (i.e., the monotonic increase or the monotonic decrease) of the parameter. Accordingly, the motor driving apparatus can rapidly stop the operation of the motor, to avoid the motor driving apparatus breaking down or the motor generating noise. The motor driving apparatus provided in the exemplary embodiment of the present disclosure will be described in the following paragraphs.

Firstly, please refer to FIG. 1, which shows the diagram of a motor driving apparatus according to an embodiment of the instant disclosure. As shown in FIG. 1, the motor driving apparatus 100 drives a motor 10 according to a stator and a rotor (not shown in FIGs) opposite to the motor 10. More specifically, the rotor can rotate with respect to the stator to operate the motor 10 by the magnetic force and magnetic field change.

The motor driving apparatus 100 includes a full-bridge circuit 110, a control circuit 120, and a hall sensor 130. The full-bridge circuit 110 has a first switch SW1, a second switch SW2, a third switch SW3, and a fourth switch SW4. The first switch SW1 is coupled between an input end VIN and a first end TO1 of the motor 10. The second switch SW2 is coupled between the input end VIN and a second end TO2 of the motor 10. The third switch SW3 is coupled between the first end TO1 and a ground GND. The fourth switch SW4 is coupled between the second end TO2 and the ground GND. In the present disclosure, the first switch SW1 and the second switch SW2 are PMOS transistors, and the third switch SW3, and the fourth switch SW4 are NMOS transistors. The first switch SW1, the second switch SW2, the third switch SW3, and the fourth switch SW4 can be other kinds of switches, and the present disclosure is not limited thereto.

The hall sensor 130 is used for sensing the magnetic field change, to generate a hall signal HS. More specifically, the hall sensor 130 is adjacent to the motor 10, to sense the magnetic field change. When the motor 10 rotates to a certain magnetic pole (e.g., N-pole), the hall sensor 130 generates the hall signal HS with a first level (e.g., high level). When the motor 10 rotates to another magnetic pole (e.g., S-pole), the hall sensor 130 generates the hall signal HS with a second level (e.g., low level).

The control circuit 120 is coupled between the hall sensor 130 and the full-bridge circuit 110. The control circuit 120 stores a pulse width modulation (PWM) table, to control the phase commutation of the full-bridge circuit 110 according to the hall signal HS and the PWM table, thereby stopping driving the motor 10.

The PWM table indicates a relationship between a parameter and the duty cycle. The parameter of the PWM table is related to the operation of the motor 10, for example, the time, the rotation speed, the temperature, or another parameter. The present disclosure is not limited thereto. The duty cycle increases with the monotone variation of the parameter. In the present disclosure, the parameter is the time, and the duty cycle increases with the increase of the time. Or the parameter is the rotation speed of the motor 10, and the duty cycle increases with the decrease of the rotation speed.

The time is taken as example of the parameter in this disclosure for illustration. As shown in FIG. 2A, the PWM table P1 indicates a relationship between the time and the duty cycle. The duty cycle increases with the increase of the time, and the duty cycle increases from an initial value. For example, the initial value of the duty cycle is 10%. When the time is 1 sec, the duty cycle is 20%. When the time is 3 sec, the duty cycle is 75%.

Figure 2B:
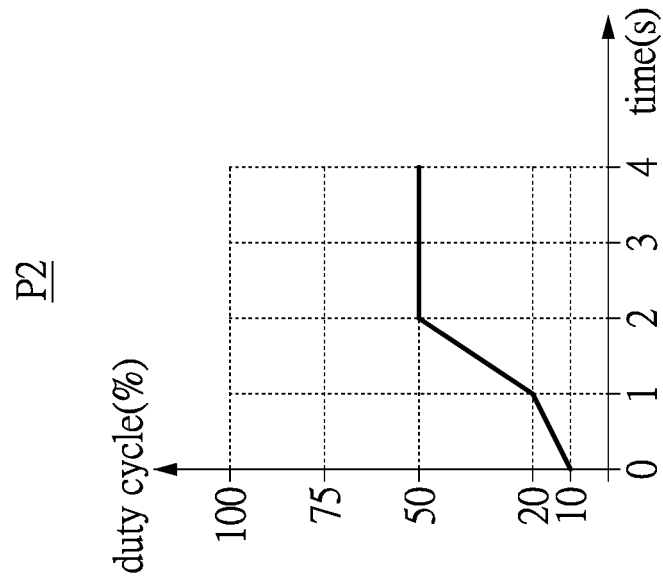
FIG. 2B shows the diagram of a PWM table according to another embodiment of the instant disclosure.
Figure 2A:
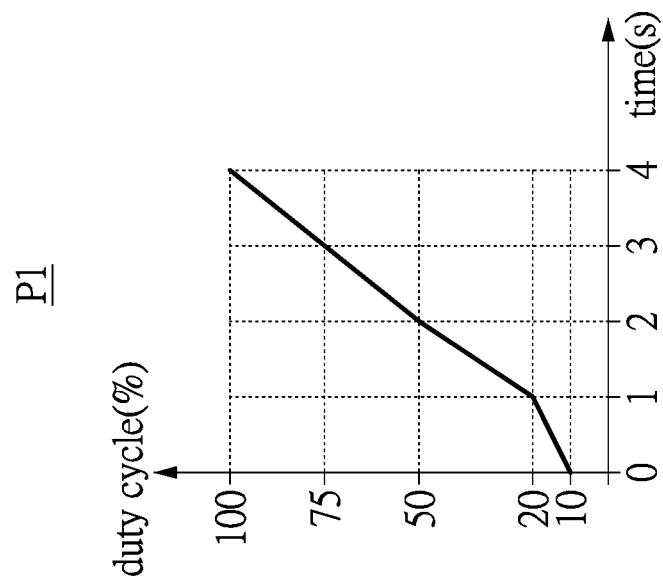
FIG. 2A shows the diagram of a PWM table according to an embodiment of the instant disclosure.

As shown in FIG. 2B, the PWM table P2 indicates a relationship between the time and the duty cycle. The duty cycle is maintained after the time increasing to 2 sec (i.e., the duty cycle is maintained after the parameter monotonically changing to a certain value). For example, when the time is 0 sec, the duty cycle is 10%, when the time is 1 sec, the duty cycle is 20%. When the time increases to 2 sec, the duty cycle is maintained to 50%.

Figure 2D:
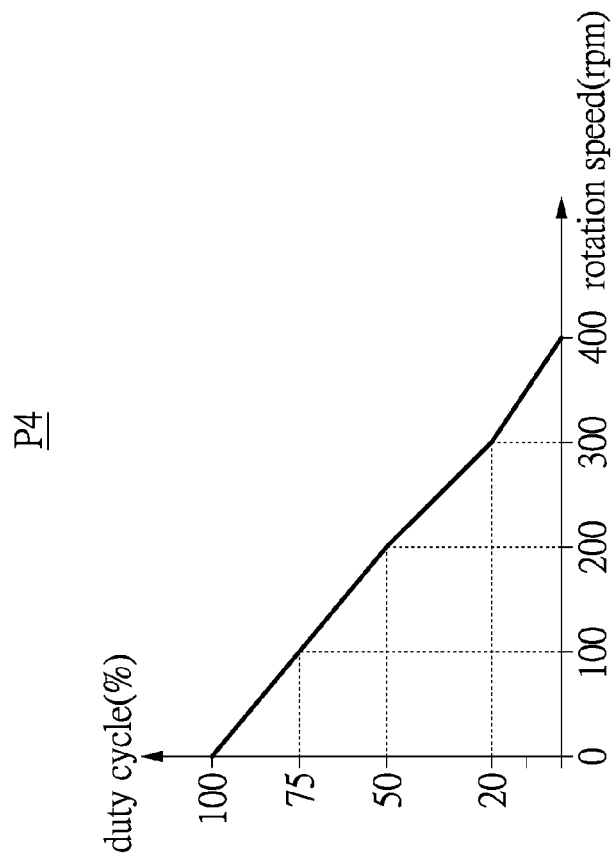
FIG. 2D shows the diagram of a PWM table according to another embodiment of the instant disclosure.
Figure 2C:
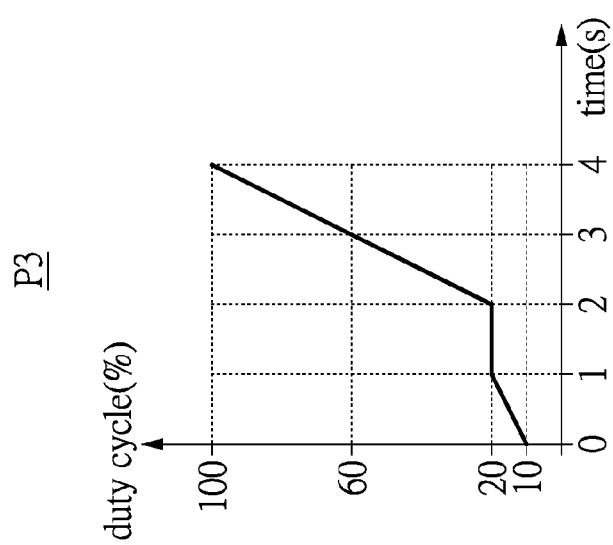
FIG. 2C shows the diagram of a PWM table according to another embodiment of the instant disclosure.

As shown in FIG. 2C, the PWM table P3 indicates a relationship between the time and the duty cycle. The duty cycle discontinuously increases with the increase of the time. This means that the duty cycle increases to a value for a period of time and maintains the value. Then the duty cycle increases after maintaining the value for a period of time. For example, the duty cycle increases during 0-1 sec, the duty cycle maintains during 1-2 sec, and the duty cycle increases during 2-4 sec.

The rotation speed is taken as an example of a parameter in this disclosure for illustration. As shown in FIG. 2D, the PWM table P4 indicates a relationship between the rotation speed and the duty cycle. The duty cycle increases with the decrease of the rotation speed. For example, when the rotation speed is 200 rpm, the duty cycle is 50%. When the rotation speed is 400 rpm, the duty cycle is 0%.

From the aforementioned exemplary embodiments, the user can establish the suitable PWM table according to the actual conditions of the operation of the motor 10. The PWM table is stored in the control circuit 120, so that the control circuit 120 controls the phase commutation of the full-bridge circuit 110 according to the hall signal HS and the pre-designed PWM table, thereby stopping driving the motor 10.

The motor driving apparatus 100 operating in a normal operation state and controlling the phase commutation of the full-bridge circuit 110 according to the hall signal HS and the pre-designed PWM table will be described in the following paragraph. For the convenience in the description, the PWM table TB1 indicates the relationship between the duty cycle D1 and the time T1, as shown in Table 1.

TABLE 1

| | $0 \leq T1 < 1$ | $1 \leq T1 < 2$ | $2 \leq T1 < 3$ | $3 \leq T1 < 4$ | $4 \leq T1 < 5$ |
|---|---|---|---|---|---|
| D1 | 10% | 20% | 50% | 75% | 100% |

Figure 3:
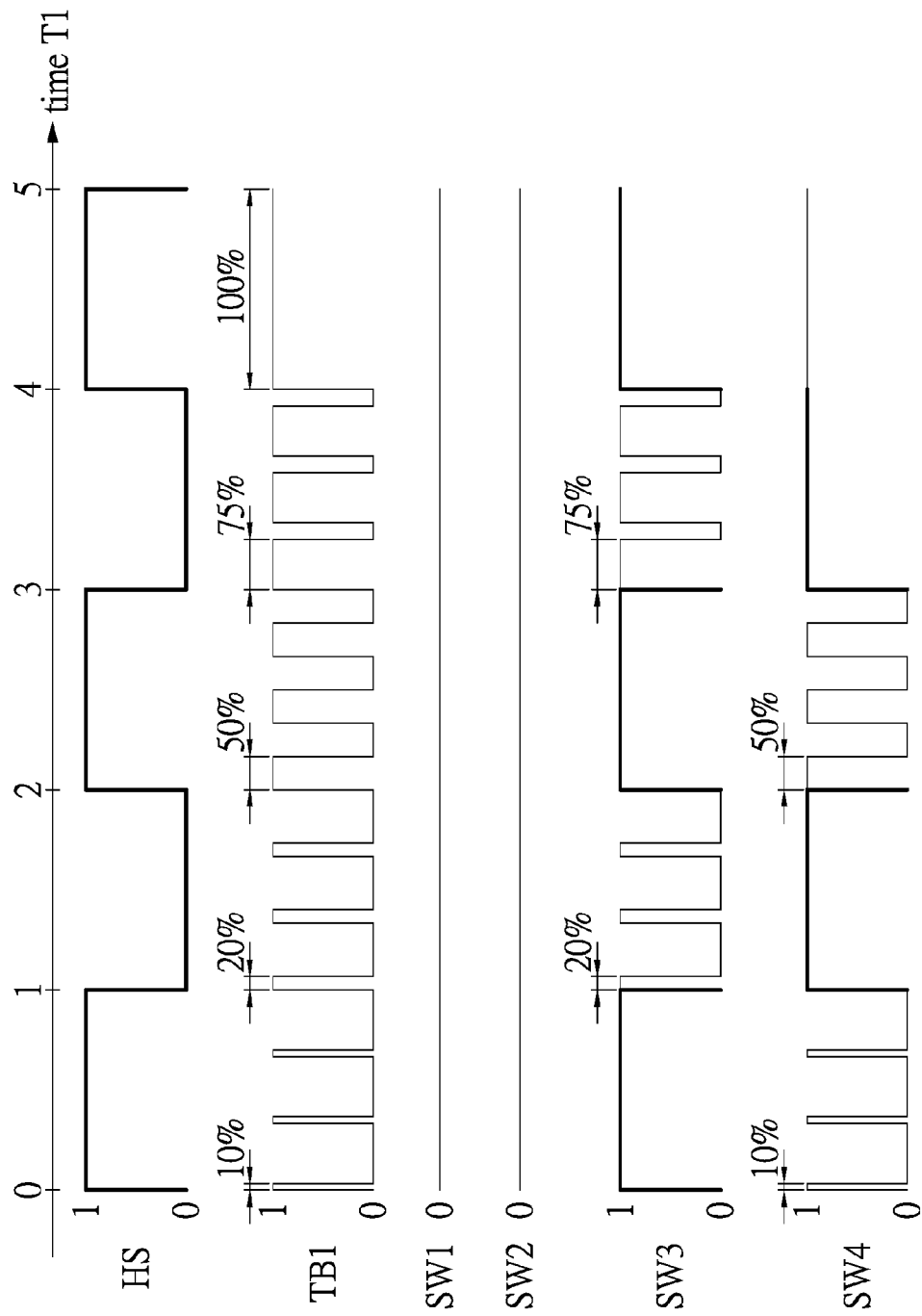
FIG. 3 shows the wave diagram of a motor driving apparatus stopping driving the motor in a normal operation state according to an embodiment of the instant disclosure.

As shown in FIG. 3, when the motor 10 operates, the hall sensor 130 senses the magnetic field variation of the motor 10, to periodically generate a hall signal HS with the first level (e.g., the high level "1" of the present disclosure) and a hall signal HS with the second level (e.g., the low level "0" of the present disclosure). When the motor driving apparatus 100 wants to stop driving the motor 10 rapidly, the control circuit 120 controls the phase commutation of the full-bridge circuit 110 according to the hall signal HS and the PWM table TB1.

Please refer to FIGS. 1, 3 and Table 1. When the hall signal HS indicates the high level "1", the control circuit 120 turns off the first switch SW1 and the second switch SW2 (i.e., completely turning off), turns on the third switch SW3 (i.e., completely turning on), and controls the turning on and the turning off of the fourth switch SW4 according to the PWM table. More specifically, the control circuit 120 acquires the present time (i.e., the present parameter) T1 corresponding to the high level (e.g., T1=0 sec), and acquires the present duty cycle D1 corresponding to the present temperature in the PWM table TB1 (e.g., when T1=0 sec, the corresponding duty cycle D1=10%), to control the turning on and the turning off of the fourth switch SW4 according to the present duty cycle D1.

When the hall signal HS indicates the low level "0", the control circuit 120 turns off the first switch SW1 and the second switch SW2 (i.e., completely turning off), turns on the fourth switch SW4 (i.e., completely turning on), and controls the turning on and the turning off of the third switch SW3 according to the PWM table. More specifically, the control circuit 120 acquires the present time (i.e., the present parameter) T1 corresponding to the low level (e.g., T1=1.3 sec), and acquires the present duty cycle D1 corresponding to the present temperature in the PWM table TB1 (e.g., when T1=1.3 sec, the corresponding duty cycle D1=20%), to control the turning on and the turning off of the third switch SW3 according to the present duty cycle D1.

Therefore, as shown in FIG. 3, during the times $0 \leq T1 < 1$, the control circuit 120 turns on the third switch SW3 (i.e., completely turning on) and turns on the fourth switch SW4 with 10% duty cycle D1 (i.e., turning on 10%). During the times $1 \leq T1 < 2$, the control circuit 120 turns on the fourth switch SW4 (i.e., completely turning on) and turns on the third switch SW3 with 20% duty cycle D1 (i.e., turning on 20%). During the times $2 \leq T1 < 3$, the control circuit 120 turns on the third switch SW3 (i.e., completely turning on) and turns on the fourth switch SW4 with 50% duty cycle D1 (i.e., turning on 50%). During the times $3T1 < 4$, the control circuit 120 turns on the fourth switch SW4 (i.e., completely turning on) and turns on the third switch SW3 with 75% duty cycle D1 (i.e., turning on 75%). During the times $4 \leq T1 < 5$, the control circuit 120 turns on the third switch SW3 (i.e., completely turning on) and turns on the fourth switch SW4 with 100% duty cycle D1 (i.e., completely turning on).

Accordingly, the duty cycle D1 of the third switch SW3 and the fourth switch SW4 increases with the increase of the time T1, to gradually increase the intensity of stopping driving the motor 10. Therefore, the control circuit 120 does not generate a large current to damage the circuit. In addition, when the motor quickly stops, the control circuit 120 does not generate noise.

In another disclosure, the PWM table TB2 indicates the relationship between the duty cycle D2 and the rotation speed rpm2, as shown in Table 2.

TABLE 2

| | 400 < rpm2 | 400 ≥ rpm2 > 300 | 300 ≥ rpm2 > 200 |
|---|---|---|---|
| D2 | 10% | 20% | 50% |

| | 200 ≥ rpm2 > 100 | 100 ≥ rpm2 > 0 |
|---|---|---|
| D2 | 50% | 50% |

Figure 4:
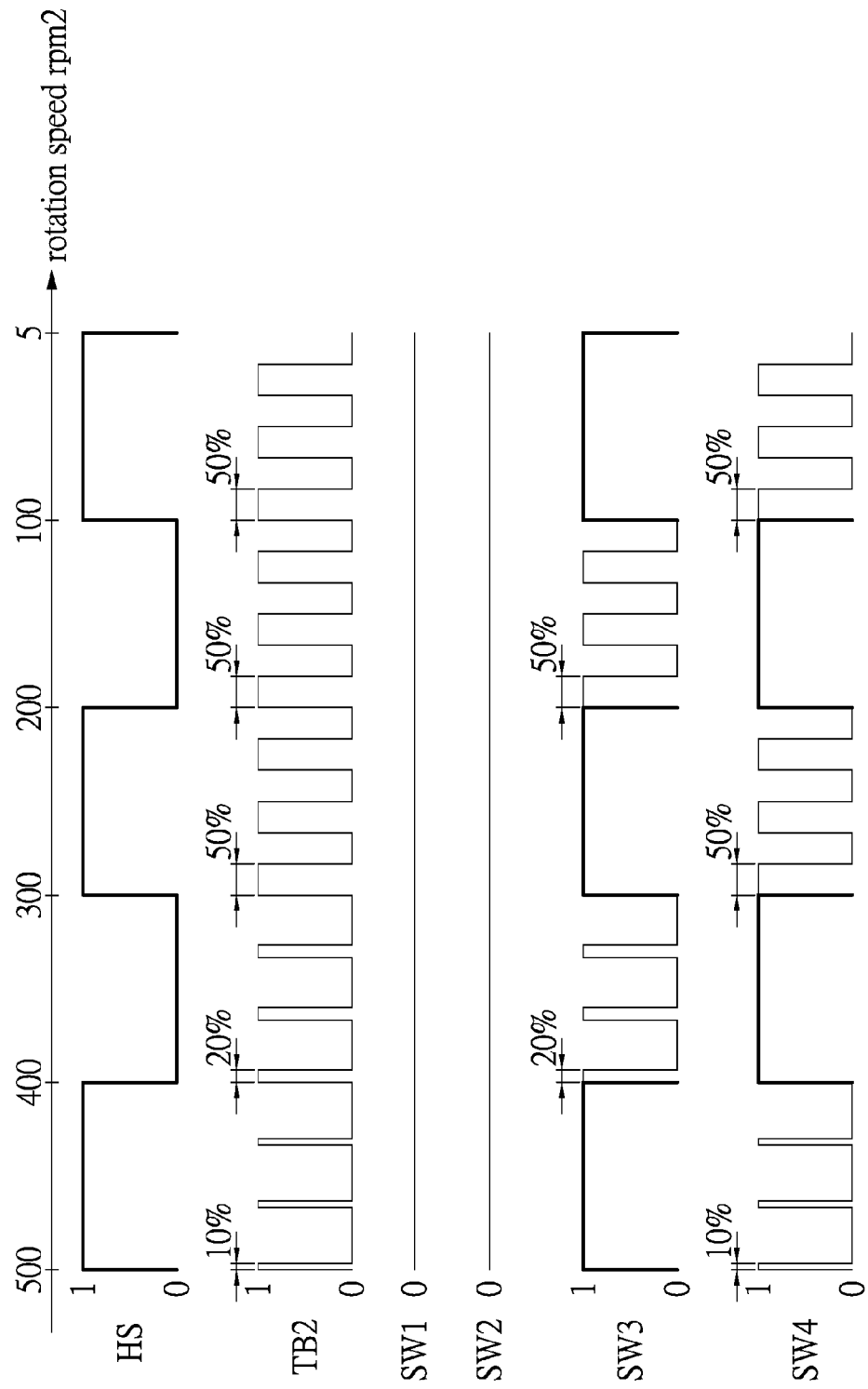
FIG. 4 shows the wave diagram of a motor driving apparatus stopping driving the motor in a normal operation state according to another embodiment of the instant disclosure.

Please refer to FIGS. 1, 4 and Table 2. When the motor 10 operates, the hall sensor 130 senses the magnetic field variation of the motor 10, to periodically generate a hall signal HS with the first level (e.g., the high level "1" of the present disclosure) and a hall signal HS with the second level (e.g., the low level "0" of the present disclosure). When the motor driving apparatus 100 wants to stop driving the motor 10 rapidly, the control circuit 120 controls the phase commutation of the full-bridge circuit 110 according to the hall signal HS and the PWM table TB2. In the present disclosure, the control circuit 120 detects the period of the hall signal HS to determine the rotation speed of the motor 10. When the period of the hall signal HS is longer, the rotation speed of the motor 10 is slower. Conversely, when the period of the hall signal HS is shorter, the rotation speed of the motor 10 is faster. With respect to the implementation method of the control circuit 120 controlling the full-bridge circuit 110 according to the hall signal HS and the PWM table TB2, it is inferred substantially from FIG. 3. The present disclosure is not limited thereto.

Therefore, as shown in FIG. 4, during the rotation speed 400<rpm2, the control circuit 120 turns on the third switch SW3 (i.e., completely turning on) and turns on the fourth switch SW4 with 10% duty cycle D1 (i.e., turning on 10%). During the rotation speed 400≥rpm2>300, the control circuit 120 turns on the fourth switch SW4 (i.e., completely turning on) and turns on the third switch SW3 with 20% duty cycle D1 (i.e., turning on 20%). During the rotation speed 300≥rpm2>200, the control circuit 120 turns on the third switch SW3 (i.e., completely turning on) and turns on the fourth switch SW4 with 50% duty cycle D1 (i.e., turning on 50%). During the rotation speed 200≥rpm2>100, the control circuit 120 turns on the fourth switch SW4 (i.e., completely turning on) and turns on the third switch SW3 with 50% duty cycle D1 (i.e., turning on 50%). During the rotation speed 100≥rpm2>0, the control circuit 120 turns on the third switch SW3 (i.e., completely turning on) and turns on the fourth switch SW4 with 50% duty cycle D1 (i.e., turning on 50%).

Accordingly, the duty cycle D2 of the third switch SW3 and the fourth switch SW4 increases with the decrease of the rotation speed rpm2, to gradually increase the intensity of stopping driving the motor 10. Therefore, the control circuit 120 does not generate the large current to damage the circuit. In addition, when the motor quickly stops, the control circuit 120 does not generate noise.

The motor driving apparatus 100 operating in a start state and controlling the phase commutation of the full-bridge circuit 110 according to the hall signal HS and the pre-designed PWM table will be described in the following paragraph. For convenience in the description, the PWM table TB3 indicates the relationship between the duty cycle D3 and the time T3, as shown in Table 3.

TABLE 3

|    | 0 ≤ T3 < 1 | 1 ≤ T3 < 2 | 2 ≤ T3 < 3 | 3 ≤ T3 < 4 | 4 ≤ T3 < 5 |
|----|------------|------------|------------|------------|------------|
| D1 | 10%        | 20%        | 20%        | 60%        | 100%       |

Figure 5:
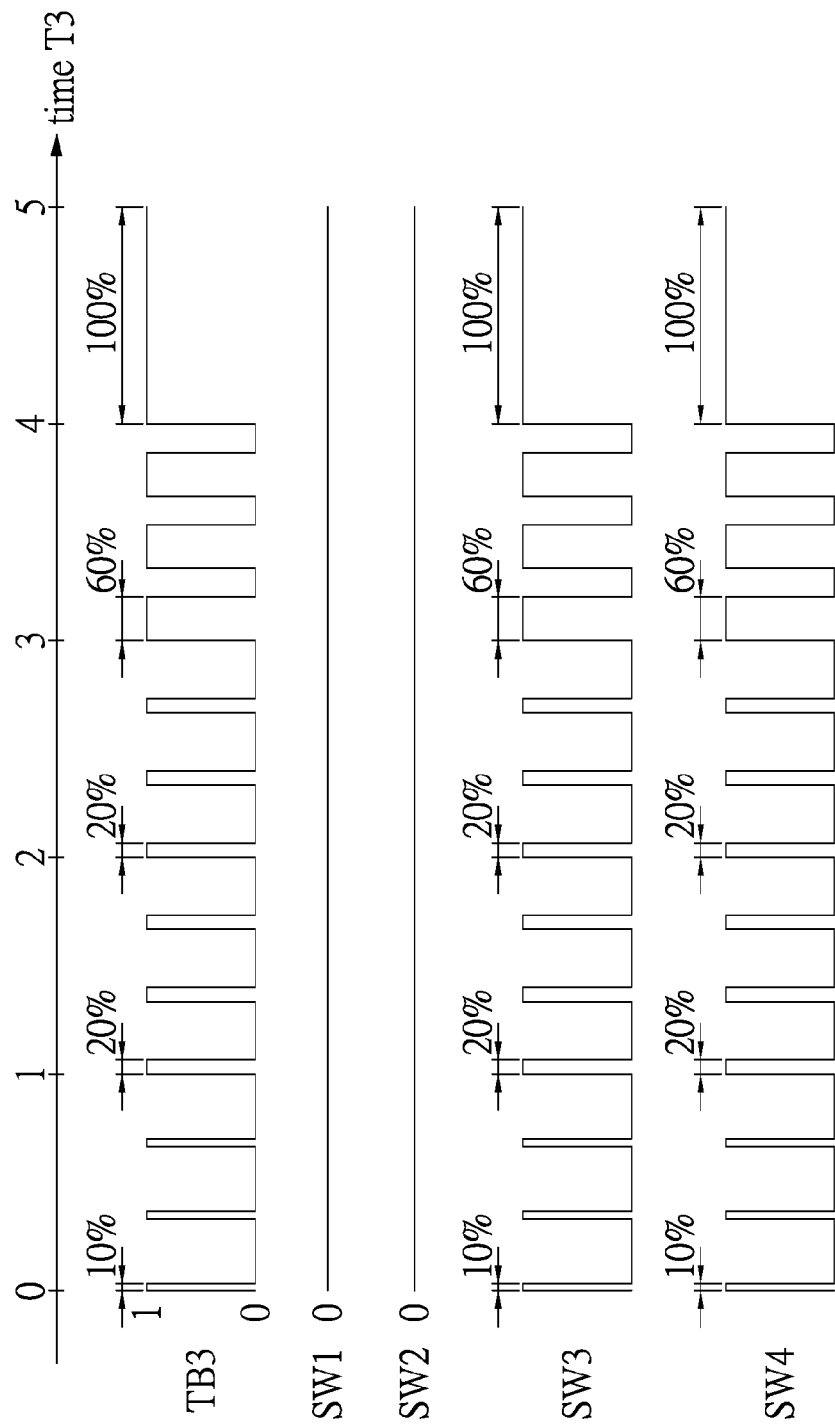
FIG. 5 shows the wave diagram of a motor driving apparatus stopping driving the motor in a start state according to an embodiment of the instant disclosure.

Please refer to FIG. 5. Before driving the motor 10 (i.e., the start state), the motor 10 can suffer from the influence of external forces (e.g., the force of wind), thereby positively or negatively rotating the motor 10. At present, the control circuit 120 turns off the first switch SW1 and the second switch SW2 (i.e., completely turning off), and simultaneously controls the turning on and the turning off of the third switch SW3 and the fourth switch SW4 according to the PWM table TB3. More specifically, the control circuit 120 starts from the time T3=0, and acquires the corresponding duty cycle D3 with the increase of the time T3 (e.g., when the time T3=2.3 sec, the corresponding duty cycle D3=20%), to simultaneously control the turning on and the turning off of the third switch SW3 and the fourth switch SW4 according to the PWM table TB3.

As shown in FIG. 5, during the times 0≤T3<1, the control circuit 120 simultaneously turns on the third switch SW3 with 10% duty cycle D3 and the fourth switch SW4 with 10% duty cycle D3 (i.e., turning on 10%). During the times 1≤T3<2, the control circuit 120 simultaneously turns on the third switch SW3 with 20% duty cycle D3 and the fourth switch SW4 with 20% duty cycle D3 (i.e., turning on 20%). During the times 2≤T3<3, the control circuit 120 simultaneously turns on the third switch SW3 with 20% duty cycle D3 and the fourth switch SW4 with 20% duty cycle D3 (i.e., turning on 20%). During the times 3≤T3<4, the control circuit 120 simultaneously turns on the third switch SW3 with 60% duty cycle D3 and the fourth switch SW4 with 60% duty cycle D3 (i.e., turning on 60%). During the times 4≤T3<5, the control circuit 120 simultaneously turns on the third switch SW3 with 100% duty cycle D3 and the fourth switch SW4 with 100% duty cycle D3 (i.e., completely turning on).

Accordingly, the control circuit 120 does not need to detect that the motor 10 is positively or negatively rotating. The control circuit 120 only turns off the first switch SW1 and the second switch SW2, and simultaneously turns on the third switch SW3 with the duty cycle D3 and the fourth switch SW4 with the duty cycle D3. The duty cycle D3 of the third switch SW3 and the fourth switch SW4 will increase with the increase of the time T3, to gradually increase the intensity of stopping driving the motor 10. Therefore, the control circuit 120 does not generate a large current to damage the circuit. In addition, when the motor quickly stops, the control circuit 120 does not generate noise.

In another disclosure, when the motor driving apparatus 100 operates in the start state, the control circuit 120 determines whether there is a rotation speed of the motor 10. When the control circuit 120 determines that there is not a rotation speed of the motor 10, it indicates that the motor 10 is not under the influence of external forces. At present, the motor driving apparatus 100 enters the normal operation state, to drive the motor 10. When the control circuit 120 determines that there is the rotation speed of the motor 10, it indicates that the motor 10 is under the influence of external forces causing it to rotate. At present, the control circuit 120 directly turns off the first switch SW1 and the second switch SW2 (i.e., completely turning off), and simultaneously controls the turning on and the turning off of the third switch SW3 and the fourth switch SW4 according to the PWM table. With respect to the implementation method of the control circuit 120 turning off the first switch SW1 and the second switch SW2, and controlling the third switch SW3 and the fourth switch SW4 according to the PWM table, it can be inferred substantially from FIG. 5. The present disclosure is not limited thereto.

Compared to the exemplary embodiment of FIG. 5, the control circuit 120 of the present embodiment determines whether there is a rotation speed of the motor 10 in advance. When the control circuit 120 determines that there is a rotation speed of the motor 10, the control circuit 120 executes the implementation method as in FIG. 5.

Similarly, the control circuit 120 can also determine whether the rotation speed of the motor 10 is more than a predefined speed. When the control circuit 120 determines that the rotation speed of the motor 10 is less than or equal to the predefined speed, it indicates that the motor 10 is not under the influence of external forces. At present, the motor driving apparatus 100 enters the normal operation state, to drive the motor 10. When the control circuit 120 determines that the rotation speed of the motor 10 is more than the predefined speed, it indicates that the motor 10 is under the influence of external forces. At present, the control circuit 120 directly turns off the first switch SW1 and the second switch SW2 (i.e., completely turning off), and simultaneously controls the turning on and the turning off of the third switch SW3 and the fourth switch SW4 according to the PWM table.

From all of the aforementioned exemplary embodiments, the control circuit 120 turns off the first switch SW1 and the second switch SW2 (i.e., completely turning off), and controls the turning on and the turning off of the third switch SW3 and the fourth switch SW4. In addition, in the present embodiment, the control method of the first switch SW1 and that of the third switch SW3 can be exchanged. The control method of the second switch SW2 and that of the fourth switch SW4 can be exchanged. This means that the control circuit 120 changes to turns off the third switch SW3 and the fourth switch SW4 (i.e., completely turning off), and changes to control the turning on and the turning off of the first switch SW1 and the second switch SW2. The first switch SW1, the second switch SW2, the third switch SW3, and the fourth switch SW4 can be applied to all of the aforementioned implementation methods, and that they are also possible to achieve the purpose of the present invention.

In summary, the invention is to provide a motor driving apparatus, which gradually increases the duty cycle according to the variation of the parameter related to the operation of the motor (e.g., the time, the rotation speed, the temperature, or other parameters related to the operation of the motor), so as to rapidly stop driving the motor, and to avoid the motor driving apparatus breaking down or the motor generating noise.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. A motor driving apparatus, adapted for stopping driving a motor in a normal operation state and a start state, and the motor driving apparatus comprising:
 a full-bridge circuit, having a first switch, a second switch, a third switch, and a fourth switch, the first switch coupled between an input end and a first end of the motor, the second switch coupled between the input end and a second end of the motor, the third switch coupled between the first end and a ground, and the fourth switch coupled between the second end and the ground;
 a hall sensor, configured for sensing the magnetic field variation of the motor, to generate a hall signal; and
 a control circuit, coupled between the hall sensor and the full-bridge circuit, configured for receiving the hall signal, and storing a pulse width modulation (PWM) table, to control the phase commutation of the full-bridge circuit according to the hall signal and the PWM table, wherein the PWM table indicates a relationship between a parameter and the duty cycle, and the duty cycle increases with the monotone variation of the parameter;
 wherein when the hall signal indicates a first level, the control circuit turns off the first switch and the second switch, turns on the third switch, and controls the turning on and the turning off of the fourth switch according to the PWM table;
 wherein when the hall signal indicates a second level, the control circuit turns off the first switch and the second switch, turns on the fourth switch, and controls the turning on and the turning off of the third switch according to the PWM table.

2. The motor driving apparatus according to claim 1, wherein when the hall signal indicates the first level, the control circuit acquires a present parameter corresponding to the first level, and acquires a present duty cycle corresponding to the present parameter in the PWM table, to control the turning on and the turning off of the fourth switch according to the present duty cycle.

3. The motor driving apparatus according to claim 1, wherein when the hall signal indicates the second level, the control circuit acquires a present parameter corresponding to the second level, and acquires a present duty cycle corresponding to the present parameter in the PWM table, to control the turning on and the turning off of the third switch according to the present duty cycle.

4. The motor driving apparatus according to claim 1, wherein the parameter is a time and the duty cycle increases with the increase of the time, or the parameter is a rotation speed and the duty cycle increases with the decrease of the rotation speed.

5. The motor driving apparatus according to claim 1, wherein in the PWM table, the duty cycle is maintained after the parameter monotonically changing to a certain value.

6. The motor driving apparatus according to claim 1, wherein the duty cycle increases from an initial value.

7. The motor driving apparatus according to claim 1, wherein in the PWM table, the duty cycle discontinuously increases with the monotone variation of the parameter.

8. The motor driving apparatus according to claim 1, wherein when the motor driving apparatus operates in the start state, the control circuit turns off the first switch and the second switch, and synchronously controls the turning on and the turning off of the third switch and the fourth switch according to the PWM table.

9. The motor driving apparatus according to claim 1, wherein when the motor driving apparatus operates in the start state, the control circuit determines whether there is a rotation speed of the motor, and when the control circuit determines that there is the rotation speed of the motor, the control circuit turns off the first switch and the second switch, and synchronously controls the turning on and the turning off of the third switch and the fourth switch according to the PWM table.

10. The motor driving apparatus according to claim 1, wherein when the motor driving apparatus operates in the start state, the control circuit determines whether a rotation speed of the motor is more than a predefined speed, and when the control circuit determines that the rotation speed of the motor is more than the predefined speed, the control circuit turns off the first switch and the second switch, and synchronously controls the turning on and the turning off of the third switch and the fourth switch according to the PWM table.

11. A motor driving apparatus, adapted for stopping driving a motor in a normal operation state and a start state, and the motor driving apparatus comprising:
 a full-bridge circuit, having a first switch, a second switch, a third switch, and a fourth switch, the first switch coupled between an input end and a first end of the motor, the second switch coupled between the input end and a second end of the motor, the third switch coupled between the first end and a ground, and the fourth switch coupled between the second end and the ground;
 a hall sensor, configured for sensing the magnetic field variation of the motor, to generate a hall signal; and
 a control circuit, coupled between the hall sensor and the full-bridge circuit, configured for receiving the hall signal, and storing a pulse width modulation (PWM) table, to control the phase commutation of the full-bridge circuit according to the hall signal and the PWM table, wherein the PWM table indicates a relationship between a parameter and the duty cycle, and the duty cycle increases with the monotone variation of the parameter;
 wherein when the hall signal indicates a first level, the control circuit turns off the third switch and the fourth switch, turns on the first switch, and controls the turning on and the turning off of the second switch according to the PWM table;
 wherein when the hall signal indicates a second level, the control circuit turns off the third switch and the fourth switch, turns on the second switch, and controls the turning on and the turning off of the first switch according to the PWM table.

12. The motor driving apparatus according to claim 11, wherein when the hall signal indicates the first level, the control circuit acquires a present parameter corresponding to the first level, and acquires a present duty cycle corresponding to the present parameter in the PWM table, to control the turning on and the turning off of the second switch according to the present duty cycle.

13. The motor driving apparatus according to claim 11, wherein when the hall signal indicates the second level, the control circuit acquires a present parameter corresponding to the second level, and acquires a present duty cycle corresponding to the present parameter in the PWM table, to control the turning on and the turning off of the first switch according to the present duty cycle.

14. The motor driving apparatus according to claim 11, wherein the parameter is a time and the duty cycle increases with the increase of the time, or the parameter is a rotation speed and the duty cycle increases with the decrease of the rotation speed.

15. The motor driving apparatus according to claim 11, wherein in the PWM table, the duty cycle is maintained after the parameter monotonically changing to a certain value.

16. The motor driving apparatus according to claim 11, wherein when the motor driving apparatus operates in the start state, the control circuit turns off the third switch and the fourth switch, and synchronously controls the turning on and the turning off of the first switch and the second switch according to the PWM table.

17. The motor driving apparatus according to claim 11, wherein when the motor driving apparatus operates in the start state, the control circuit determines whether there is a rotation speed of the motor, and when the control circuit determines that there is the rotation speed of the motor, the control circuit turns off the third switch and the fourth switch, and synchronously controls the turning on and the turning off of the first switch and the second switch according to the PWM table.

18. The motor driving apparatus according to claim 11, wherein when the motor driving apparatus operates in the start state, the control circuit determines whether a rotation speed of the motor is more than a predefined speed, and when the control circuit determines that the rotation speed of the motor is more than the predefined speed, the control circuit turns off the third switch and the fourth switch, and synchronously controls the turning on and the turning off of the first switch and the second switch according to the PWM table.

* * * * *